United States Patent
Oketani

(10) Patent No.: US 10,110,077 B2
(45) Date of Patent: Oct. 23, 2018

(54) PERMANENT-MAGNET-EMBEDDED ELECTRIC MOTOR AND COMPRESSOR

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 15/327,424

(22) PCT Filed: Aug. 21, 2014

(86) PCT No.: PCT/JP2014/071845
§ 371 (c)(1),
(2) Date: Jan. 19, 2017

(87) PCT Pub. No.: WO2016/027338
PCT Pub. Date: Feb. 25, 2016

(65) Prior Publication Data
US 2017/0163107 A1    Jun. 8, 2017

(51) Int. Cl.
   *H02K 1/27*   (2006.01)
   *H02K 1/02*   (2006.01)
   *H02K 1/22*   (2006.01)

(52) U.S. Cl.
   CPC .............. *H02K 1/2706* (2013.01); *H02K 1/02* (2013.01); *H02K 1/27* (2013.01); *H02K 1/276* (2013.01); *H02K 1/22* (2013.01); *H02K 2201/06* (2013.01)

(58) Field of Classification Search
   CPC ........ H02K 1/27; H02K 1/2706; H02K 1/276; H02K 1/2766; H02K 29/03; H02K 21/16
   See application file for complete search history.

(56) References Cited

U.S. PATENT DOCUMENTS 5,929,547 A * 7/1999 Kim ...................... H02K 1/2766
                                                  310/156.53
6,340,857 B2 * 1/2002 Nishiyama ............. H02K 1/276
                                                  310/156.21
(Continued)

FOREIGN PATENT DOCUMENTS

CN    101938171 A    1/2011
EP    2 270 954 A2   1/2011
(Continued)

OTHER PUBLICATIONS

Office Action dated Aug. 8, 2017 issued in corresponding JP patent application No. 2016-543539 (and English translation).
(Continued)

*Primary Examiner* — Tran Nguyen
(74) *Attorney, Agent, or Firm* — Posz Law Group, PLC

(57) ABSTRACT

A permanent-magnet-embedded electric motor includes a stator core; a rotor core disposed on an inner diameter side of the stator core and including a plurality of magnet insertion holes corresponding to the number of magnetic poles; and a plurality of permanent magnets arrayed in a rotating direction in the magnet insertion holes. Gaps between two permanent magnets adjacent to each other among the permanent magnets disposed in the magnet insertion holes are formed such that the gaps on the radially outer side are larger than the gaps on the radially inner side.

13 Claims, 7 Drawing Sheets

(56) References Cited

U.S. PATENT DOCUMENTS

| | | |
|---|---|---|
| 6,359,359 B1 | 3/2002 | Miura et al. |
| 6,800,967 B2 | 10/2004 | Oshima et al. |
| 6,847,144 B1 | 1/2005 | Luo |
| 8,072,110 B2 * | 12/2011 | Ida .................. F04C 18/322 |
| | | 310/156.53 |
| 2007/0126304 A1 * | 6/2007 | Ito ..................... H02K 1/2766 |
| | | 310/156.53 |
| 2012/0235531 A1 | 9/2012 | Fukasaku et al. |
| 2014/0042857 A1 | 2/2014 | Mader et al. |

FOREIGN PATENT DOCUMENTS

| | | |
|---|---|---|
| EP | 2538528 A2 | 12/2012 |
| JP | H11-004555 A | 1/1999 |
| JP | 2000-228838 A | 8/2000 |
| JP | 2000-324736 A | 11/2000 |
| JP | 2001-078402 A | 3/2001 |
| JP | 2003-164085 A | 6/2003 |
| JP | 2004-007937 A | 1/2004 |
| JP | 2005-198365 A | 7/2005 |
| JP | 2006-158037 A | 6/2006 |
| JP | 2006-261433 A | 9/2006 |
| JP | 2010-045932 A | 2/2010 |
| JP | 2010-183692 A | 8/2010 |
| JP | 2010-284062 A | 12/2010 |
| JP | 2011-015499 A | 1/2011 |
| JP | 2012-105482 A | 5/2012 |
| JP | 2012-213310 A | 11/2012 |
| JP | 2013-219911 A | 10/2013 |
| WO | 01/95460 A1 | 12/2001 |

OTHER PUBLICATIONS

International Search Report of the International Searching Authority dated Nov. 18, 2014 for the corresponding International application No. PCT/JP2014/071845 (and English translation).

Office Action dated Jun. 4, 2018 issued in corresponding CN patent application No. 201480081221.4 (and English translation).

* cited by examiner

PERMANENT-MAGNET-EMBEDDED ELECTRIC MOTOR AND COMPRESSOR

CROSS REFERENCE TO RELATED APPLICATION

This application is a U.S. national stage application of International Patent Application No. PCT/JP2014/071845 filed on Aug. 21, 2014, the disclosure of which is incorporated herein by reference.

TECHNICAL FIELD

The present invention relates to a permanent-magnet-embedded electric motor that includes a stator core; a rotor core disposed on the inner diameter side of the stator core and including a plurality of magnet insertion holes corresponding to the number of magnetic poles; and a plurality of permanent magnets for inserting into the magnet insertion holes, and to a compressor.

BACKGROUND

In general permanent-magnet-embedded electric motors, the rotor core, which is formed by stacking magnetic steel sheets that have been die-cut into a specific shape while they are being swaged, includes a plurality of magnet insertion holes into each of which a permanent magnet is inserted.

The relative position of the permanent magnet to the tooth tip in the rotating direction varies due to the rotation of the rotor. Magnetic flux inside the rotor is not inverted in its direction by 180 degrees but varies within a certain range according to variations in the current flowing in the winding wound around each tooth. When a rare earth magnet is used as an exemplary permanent magnet on the surface of which a current easily flows, variations in the magnetic flux inside the rotor result in eddy currents flowing on the surface of the permanent magnet. The eddy currents result in Joule heat in the permanent magnet and the Joule heat causes a loss in the electric motor. Furthermore, the Joule heat raises the temperature of the permanent magnet. Especially in the case of a rare earth magnet, coercivity drops, which may cause irreversible demagnetization.

As a method to mitigate the eddy currents generated on the surface of the permanent magnet, there is a method in which a permanent magnet per pole is divided into a plurality of pieces, i.e., a plurality of permanent magnets are inserted into a single magnet insertion hole. When a permanent magnet per pole is simply divided into a plurality of pieces, if the rotating-direction side surfaces of permanent magnets adjacent to each other among the permanent magnets inserted into the magnet insertion hole are in close contact with each other, the electrical resistance between the permanent magnets is reduced, thereby reducing the effect of mitigating the eddy currents.

In the rotor described in the following Patent Literature 1, the cross section of each magnet insertion hole viewed from the axial direction of the electric motor has a curved shape that is convex toward the radially inner side, and a plurality of permanent magnets are inserted into one magnet insertion hole such that they are arrayed in the rotating direction. This structure allows rotating-direction side surfaces of permanent magnets adjacent to each other among the permanent magnets inserted into the magnet insertion hole to be in contact with each other on the radially outer side while being apart from each other on the radially inner side. That is, the rotating-direction direction side surfaces of permanent magnets adjacent to each other are in contact with each other only on the radially outer side, thereby suppressing a decrease in electrical resistance between the permanent magnets.

PATENT LITERATURE

Patent Literature 1: Japanese Patent Application Laid-Open No. 2012-105482

In a permanent-magnet-embedded electric motor, variations in magnetic flux inside the rotor core are great in a region on the radially outer side of the permanent magnet while being small in a region on the radially inner side of the permanent magnet. This is because of the following reason. That is, in a region on the radially outer side of the permanent magnet, magnetic flux flows in such a manner as to connect the surface of the permanent magnet and the tooth tip by the shortest path possible and thus the direction of the magnetic flux varies according to the rotation of the rotor while in a region on the radially inner side of the permanent magnet, magnetic flux flows in such a manner as to connect the surfaces of the permanent magnets adjacent to each other.

In the rotor described in the above Patent Literature 1, the rotating-direction side surfaces of the permanent magnets adjacent to each other are in contact with each other only on the radially outer side. Therefore, even though the rotating-direction side surfaces are apart from each other on the radially inner side, magnetic flux flows in such a manner as to connect the radially outer side surfaces of the permanent magnets adjacent to each other and thus there is a problem in that the effect of mitigating the eddy currents is not exhibited.

SUMMARY

The present invention has been achieved in view of the above and an object of the present invention is to provide a permanent-magnet-embedded electric motor that can mitigate a loss due to eddy currents.

In order to solve the above problem and attain the object, an aspect of the present invention is a permanent-magnet-embedded electric motor, including a stator core; a rotor core disposed on an inner diameter side of the stator core and including a plurality of magnet insertion holes corresponding to the number of magnetic poles; and a plurality of permanent magnets arrayed in a rotating direction in the magnet insertion holes. A gap between two permanent magnets adjacent to each other among the permanent magnets disposed in the magnet insertion holes is larger on a radially outer side than on a radially inner side.

The present invention achieves the effect of mitigating a loss due to eddy currents.

DETAILED DESCRIPTION

Exemplary embodiments of a permanent-magnet-embedded electric motor and a compressor according to the present invention will be described in detail below with reference to the drawings. The present invention is not limited to the embodiments.

Embodiment

Figure 1:
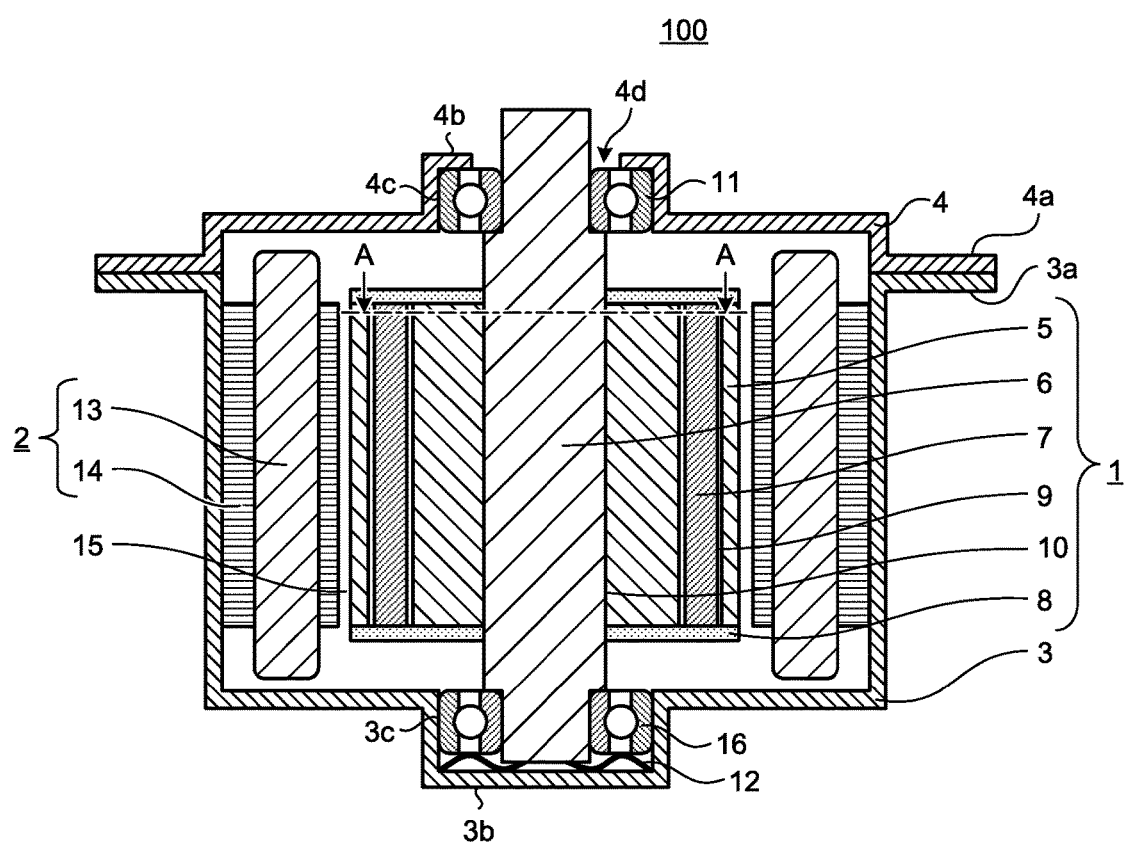
FIG. 1 is a longitudinal cross-sectional view of a permanent-magnet-embedded electric motor according to an embodiment of the present invention.
Figure 2:
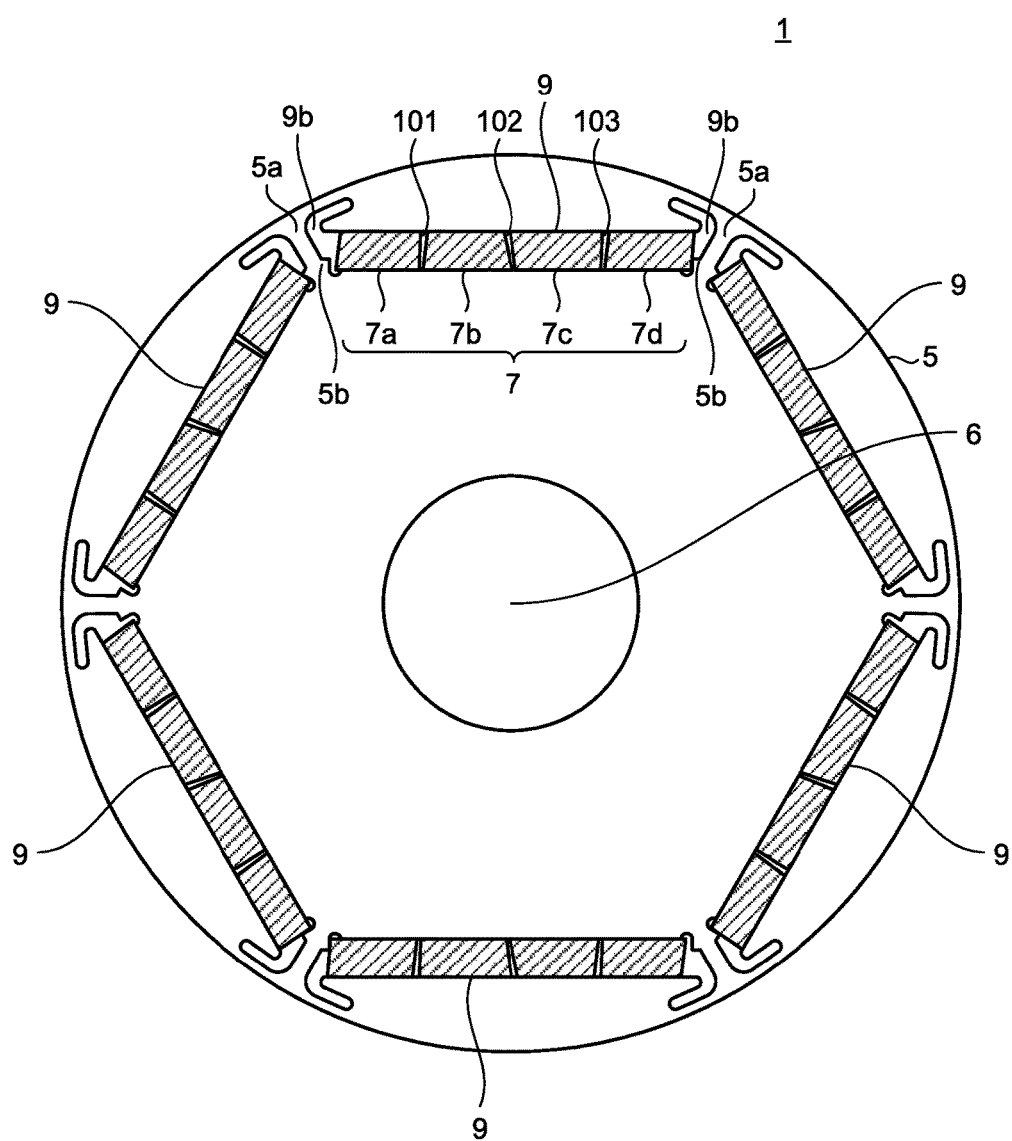
FIG. 2 is a cross-sectional view of a rotor illustrated in FIG. 1 viewed from arrows A-A.
Figure 3:
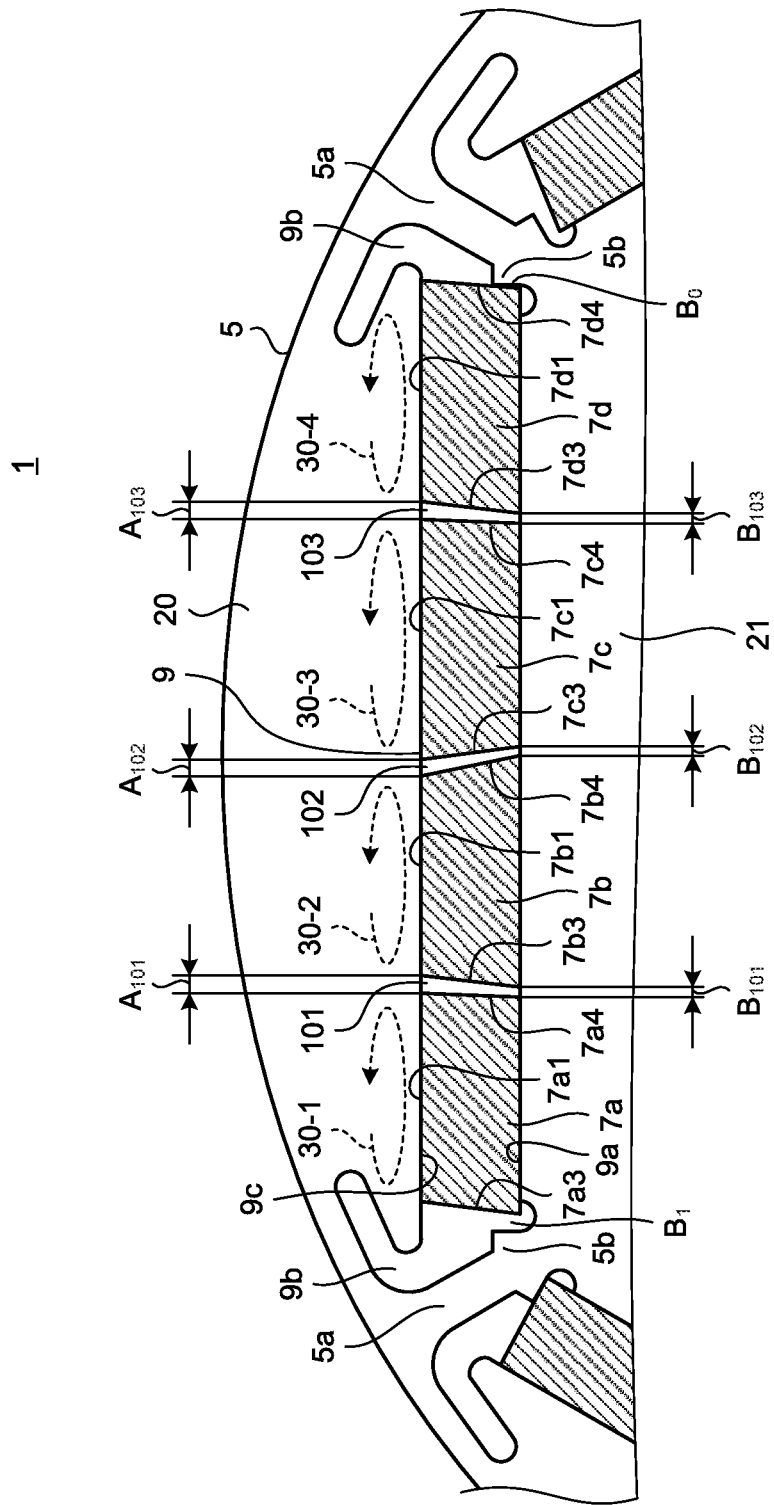
FIG. 3 is an enlarged partial view of the rotor illustrated in FIG. 2.

FIG. 1 is a longitudinal cross-sectional view of a permanent-magnet-embedded electric motor according to an embodiment of the present invention. FIG. 2 is a cross-sectional view of a rotor illustrated in FIG. 1 viewed from arrows A-A. FIG. 3 is an enlarged partial view of the rotor illustrated in FIG. 2.

A permanent-magnet-embedded electric motor 100 illustrated in FIG. 1 includes a rotor 1, a stator 2, a frame 3, and a bracket 4.

The rotor 1 includes an annular rotor core 5; a shaft 6 disposed in a shaft fitting hole 10 of the rotor core 5; magnet insertion holes 9 that are formed on the outer circumferential side of the rotor core 5, extend in the axial direction of the rotor core 5, and penetrate between both ends of the rotor core 5; permanent magnets 7 that are inserted into the magnet insertion holes 9; and disk-shaped end plates 8 that are attached to both end surfaces of the rotor core 5.

The rotor core 5 is formed by stacking magnetic steel sheets that have been die-cut into a specific shape while they are being swaged. The end plates 8 prevent the permanent magnets 7 inserted into the magnet insertion hole 9 from sliding out therefrom. Methods to fix the end plate 8 to the end surface of the rotor core 5 apart from welding and bonding include a method to form through holes in the rotor core 5 and the end plate 8, and to then insert bolts into the through holes and fasten the rotor core 5 and the end plate 8 together or to then insert rivets into the through holes and perform swaging.

The shaft 6 has a columnar shape. The shaft fitting hole 10 also has a shape corresponding to the shape of the shaft 6. The shaft 6 is fitted in the shaft fitting hole 10 by shrink-fitting or press-fitting.

The frame 3 is formed into a cylindrical shape with a bottom. One end of the frame 3 in the axial direction is formed into a flange shape extending outward in the radial direction. A flange portion 3a formed into a flange shape is disposed such that it is in contact with a flange portion 4a formed in the bracket 4.

A central portion of the other end of the frame 3 in the axial direction, which is a bottom portion, is formed with a recessed portion 3c protruding toward the lower side in FIG. 1, i.e., the counter-load side of the rotor 1. In the recessed portion 3c, a bearing 16 that supports the shaft 6 on the counter-load side of the rotor 1 is disposed.

Note that a wave washer 12 is disposed between a seat surface portion 3b in the recessed portion 3c and the bearing 16. The wave washer 12 biases the bearing 16 in the axial direction, thereby allowing for the application of a pre-load to the bearing 16 and thus allowing for the suppression of vibration of the shaft 6.

The bracket 4 is formed into a cylindrical shape. One end of the bracket 4 in the axial direction is formed into a flange shape extending outward in the radial direction. The flange portion 4a formed into a flange shape is in contact with the flange portion 3a formed in the frame 3.

A central portion of the other end of the bracket 4 in the axial direction is formed with a recessed portion 4c protruding toward the upper side in FIG. 1, i.e., the load-side of the rotor 1. In the recessed portion 4c, a bearing 11 that supports the shaft 6 on the load-side of the rotor 1 is disposed. The center of a seat surface portion 4b of the recessed portion 4c is formed with a hole 4d for passing the shaft 6 on the load-side of the rotor 1 therethrough.

The bracket 4 is fixed to the frame 3 by mounting the bracket 4 in such a manner as to close the opening of the frame 3, then inserting a fastening member (not illustrated) into the flange portion 3a and the flange portion 4a, and then fastening the fastening member.

The stator 2 includes an annular stator core 13 and a winding 14 supplied with power from an external source. The stator 2 is fixed to the inside of the frame 3 by shrink-fitting, for example. The stator core 13 is formed by stacking magnetic steel sheets that have been die-cut into a specific shape while they are being swaged. On the inner circumferential side of the stator core 13, a plurality of teeth (not illustrated) are provided at certain intervals in the rotating direction. The winding 14 is wound around each of the teeth with an insulator (not illustrated) therebetween. Inside the stator 2, the rotor 1 is disposed with a gap 15 therebetween.

In FIGS. 2 and 3, in the rotor core 5, the magnet insertion holes 9 are provided at certain intervals in the rotating direction. The number of the magnet insertion holes 9 corresponds to the number of magnetic poles. Each of the magnet insertion holes 9 has a rectangular shape with a radially inner side surface 9a and a radially outer side surface 9c extending linearly in the rotating direction. In each of the magnet insertion holes 9, the permanent magnets 7 having different polarities are disposed alternately in the rotating direction. In the rotor 1 of the example illustrated, the number of poles of the permanent magnets 7 is six.

In the present embodiment, the permanent magnet 7 that forms one magnetic pole includes four permanent magnets 7a, 7b, 7c, and 7d and the permanent magnets 7a, 7b, 7c, and 7d are arrayed in the rotating direction.

Note that minute gaps are provided between the permanent magnets 7a, 7b, 7c, and 7d and the magnet insertion hole 9 in the rotating direction and the radial direction to allow the permanent magnets 7a, 7b, 7c, and 7d to be inserted into the magnet insertion hole 9 with a clearance fit.

Furthermore, when the number of the permanent magnets 7a, 7b, 7c, and 7d that form one magnetic pole is larger, the effect of mitigating the eddy currents can be enhanced. However, manufacturing costs increase because the number of steps to insert the permanent magnets into the magnet insertion hole 9 also increases and the cost per unit weight also increases due to such processing. Therefore, the number of the permanent magnets 7a, 7b, 7c, and 7d that forms one magnetic pole is determined by considering the balance between the effect of mitigating the eddy currents and manufacturing costs. The effect of mitigating eddy currents will be described later.

The rotor core 5 is formed with twelve flux barriers 9b, which are gaps for preventing short-circuiting of the magnetic flux. Each of the flux barriers 9b extends from any of rotating-direction side surfaces 7a3 and 7d4 of the permanent magnets 7a and 7d toward the outer circumferential surface of the rotor core 5.

The rotor core 5 further includes a plurality of protrusions 5b for limiting movement of the permanent magnets 7a, 7b, 7c, and 7d inserted into the magnet insertion hole 9. The respective protrusions 5b are formed at both end portions, in the rotating direction, of the radially inner side surface 9a of the magnet insertion hole 9. Providing the protrusions 5b allows the rotating-direction side surfaces 7a3 and 7d4 of the permanent magnets 7a and 7d inserted into the magnet insertion hole 9 to be held by the protrusions 5b, thereby allowing for limited movement of the permanent magnets 7a, 7b, 7c, and 7d while the rotor core 5 is driven.

The rotating-direction side surface 7a3 on one side of the permanent magnet 7a illustrated in FIG. 3 is located on the flux barrier 9b side. A gap 101 is formed between a rotating-direction side surface 7a4 on the other side of the permanent magnet 7a and a rotating-direction side surface 7b3 on one side of the permanent magnet 7b. A gap 102 is formed between a rotating-direction side surface 7b4 on the other side of the permanent magnet 7b and a rotating-direction side surface 7c3 on one side of the permanent magnet 7c. A gap 103 is formed between a rotating-direction side surface 7c4 on the other side of the permanent magnet 7c and a rotating-direction side surface 7d3 on one side of the permanent magnet 7d. Furthermore, the rotating-direction side surface 7d4 on the other side of the permanent magnet 7d is located on the flux barrier 9b side. Note that in the example illustrated, a gap $B_1$ is formed between the rotating-direction side surface 7a3 of the permanent magnet 7a and the protrusion 5b. A minute gap $B_0$ is also formed between the rotating-direction side surface 7d4 of the permanent magnet 7d and the protrusion 5b.

$A_{101}$ represents a gap on the radially outer side of the gap 101; $B_{101}$ represents a gap on the radially inner side of the gap 101; $A_{102}$ represents a gap on the radially outer side of the gap 102; $B_{102}$ represents a gap on the radially inner side of the gap 102; $A_{103}$ represents a gap on the radially outer side of the gap 103; and $B_{103}$ represents a gap on the radially inner side of the gap 103.

In the rotor 1 according to the present embodiment, the gaps 101, 102, and 103 are formed such that the gaps $A_{101}$, $A_{102}$, and $A_{103}$ on the radially outer side are larger than the gaps $B_{101}$, $B_{102}$, and $B_{103}$ on the radially inner side. That is, the gaps between permanent magnets adjacent to each other among the permanent magnets 7a, 7b, 7c, and 7d inserted into each of the magnet insertion holes 9 satisfy the relations represented by formulas (1) to (3).

[Formula 1]

$$A_{101} > B_{101} \quad (1)$$

[Formula 2]

$$A_{102} > B_{102} \quad (2)$$

[Formula 3]

$$A_{103} > B_{103} \quad (3)$$

As described above, the magnet insertion hole 9 has a rectangular shape extending in the rotating direction of the rotor 1. Therefore, by disposing the permanent magnets 7a, 7b, 7c, and 7d such that the relations represented by formulas (1) to (3) are satisfied, the relations represented by formulas (1) to (3) are maintained even when the permanent magnets 7a, 7b, 7c, and 7d move in the rotating direction inside the magnet insertion hole 9 due to rotation of the rotor 1. Note that when the rotating-direction side surfaces 7a4 and 7b3 of the permanent magnets 7a and 7b adjacent to each other are in contact with each other, the gap $A_{101}$ or the gap $B_{101}$ equals zero. Since the gap $A_{101}$ between the permanent magnets 7a and 7b satisfies the relation represented by formula (1), the gap $B_{101}$ satisfies formula (4). Moreover, when the rotating-direction side surfaces 7b4 and 7c3 of the permanent magnets 7b and 7c adjacent to each other are in contact with each other, the gap $A_{102}$ or the gap $B_{102}$ equals zero. Because the gap $A_{102}$ between the permanent magnets 7b and 7c satisfies the relation represented by formula (2), the gap $B_{102}$ satisfies formula (5). When the rotating-direction side surfaces 7c4 and 7d3 of the permanent magnets 7c and 7d adjacent to each other are in contact with each other, the gap $A_{103}$ or the gap $B_{103}$ equals zero. Because the gap $A_{103}$ between the permanent magnets 7c and 7d satisfies the relation represented by formula (3), the gap $B_{103}$ satisfies formula (6).

[Formula 4]

$$B_{101} = 0 \quad (4)$$

[Formula 5]

$$B_{102} = 0 \quad (5)$$

[Formula 6]

$$B_{103} = 0 \quad (6)$$

In other words, the gaps $A_{101}$, $A_{102}$, and $A_{103}$ satisfy the relations represented by formulas (7) to (9).

[Formula 7]

$$A_{101} > 0 \quad (7)$$

[Formula 8]

$$A_{102} > 0 \quad (8)$$

[Formula 9]

$$A_{103} > 0 \quad (9)$$

In this manner, the gaps $A_{101}$, $A_{102}$, and $A_{103}$ on the radially outer side can be secured between the permanent magnets adjacent to each other among the permanent magnets 7a, 7b, 7c, and 7d inserted into each of the magnet insertion holes 9 in the rotor 1 according to the present embodiment. Hereinafter, effects obtained by this structure will be specifically described.

Figure 4:
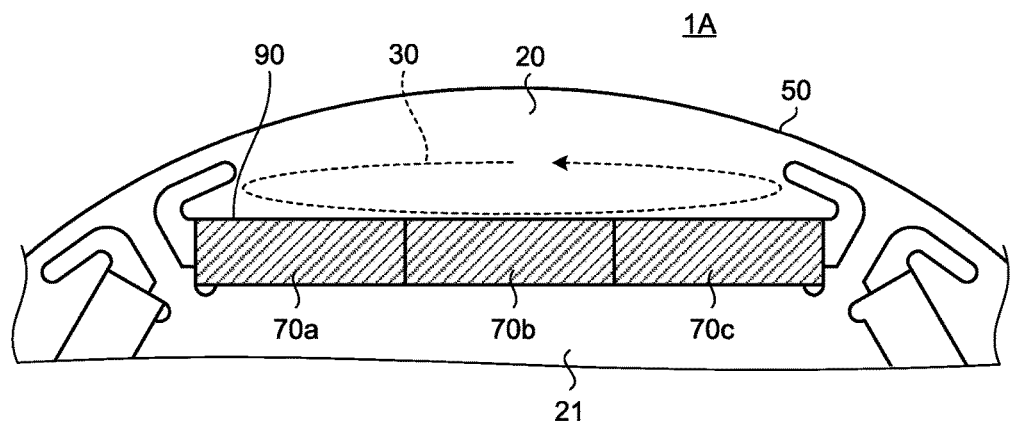
FIG. 4 is a cross-sectional view of a conventional rotor with a rectangular magnet insertion hole into which a plurality of permanent magnets are inserted.
Figure 5:
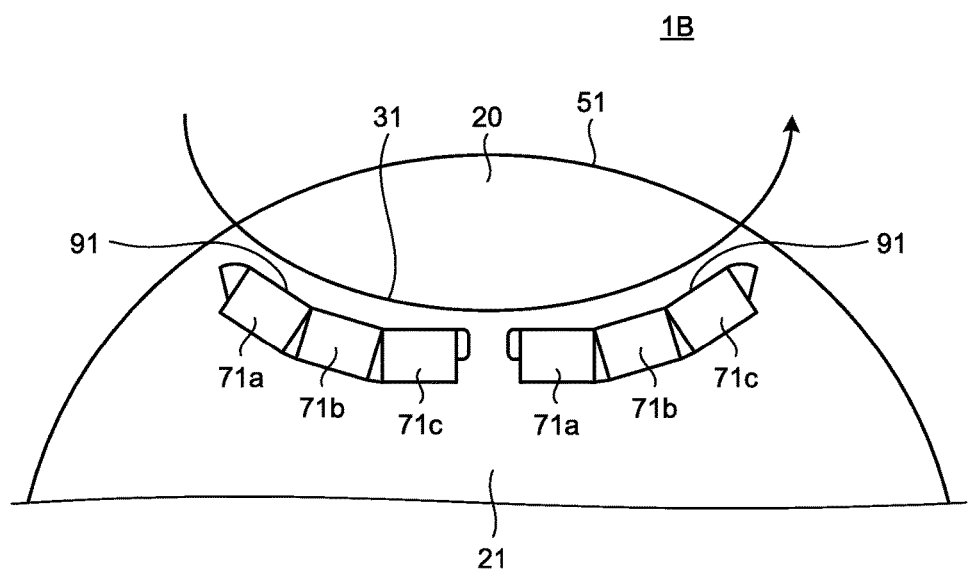
FIG. 5 is a cross-sectional view of a conventional rotor with curved magnet insertion holes into each of which a plurality of permanent magnets are inserted, the holes being convex toward the radially inner side of the rotor core.

FIG. 4 is a cross-sectional view of a conventional rotor 1A with a rectangular magnet insertion hole into which a plurality of permanent magnets are inserted. FIG. 5 is a cross-sectional view of a conventional rotor with curved magnet insertion holes that are convex toward a radially inner side of a rotor core and each of into which a plurality of permanent magnets are inserted.

To simplify the explanation, a rotor core 50 with one magnet insertion hole 90 into which three permanent magnets 70a, 70b, and 70c are inserted is illustrated FIG. 4. Rotating-direction side surfaces of the permanent magnets 70a and 70b adjacent to each other are in contact with each other on the radially outer side and the radially inner side. Likewise, rotating-direction side surfaces of the permanent magnets 70b and 70c adjacent to each other are in contact with each other on the radially outer side and the radially inner side. In such a case, the rotating-direction side surfaces of the permanent magnets adjacent to each other are closely in contact with each other and thus electrical resistance between the permanent magnets decreases. Furthermore, variations in magnetic flux inside the rotor core 50 are great in a region 20 on the radially outer side of the permanent magnets 70a, 70b, and 70c while being small in a region 21 on the radially inner side of the permanent magnets 70a, 70b, and 70c. An eddy current 30 as illustrated by a dotted line flows on radially outer side surfaces of the permanent magnets 70a, 70b, and 70c. The eddy current 30 generates Joule heat in the permanent magnets 70a, 70b, and 70c and the Joule heat causes a loss in the electric motor.

A rotor 1B illustrated in FIG. 5 has the structure of the aforementioned Patent Literature 1. A rotor core 51 illustrated in FIG. 5 is formed with two magnet insertion holes 91 in a curved shape that is convex toward a radially inner side. A plurality of permanent magnets 71a, 71b, and 71c are inserted into each of the magnet insertion holes 91 along a rotating direction. Note that in the rotor core 51, the two magnet insertion holes 91 make a pair. The two magnet insertion holes 91 and the permanent magnets 71a, 71b, and 71c inserted into each of the two magnet insertion holes 91 form one magnetic pole. When the permanent magnets 71a, 71b, and 71c are inserted into the magnet insertion holes 91 in a curved shape in this manner, the rotating-direction side surfaces of the permanent magnets adjacent to each other are apart from each other on the radially inner side, thereby suppressing a decrease in electrical resistance between the permanent magnets. However, even though the rotating-direction side surfaces of the permanent magnets adjacent to each other are apart from each other on the radially inner side, the rotating-direction side surfaces are in contact with each other on the radially outer side. In the conventional rotor 1B, therefore, magnetic flux 31 flows in such a manner as to connect radially outer side surfaces of the permanent magnets 71a, 71b, and 71c and the effect of mitigating the eddy currents is not exhibited.

In the rotor 1 according to the present embodiment, as illustrated in FIG. 3, the gaps $A_{101}$, $A_{102}$, and $A_{103}$ are provided between the rotating-direction side surfaces of the permanent magnets adjacent to each other on the radially outer side. As a result, eddy currents 30-1, 30-2, 30-3, and 30-4, which are smaller than the eddy current 30 illustrated in FIG. 4, flow on radially outer side surfaces 7a1, 7b1, 7c1, and 7d1 of the permanent magnets 7a, 7b, 7c, and 7d, respectively. This mitigates Joule heat generated in the permanent magnets 7a, 7b, 7c, and 7d.

Figure 6:
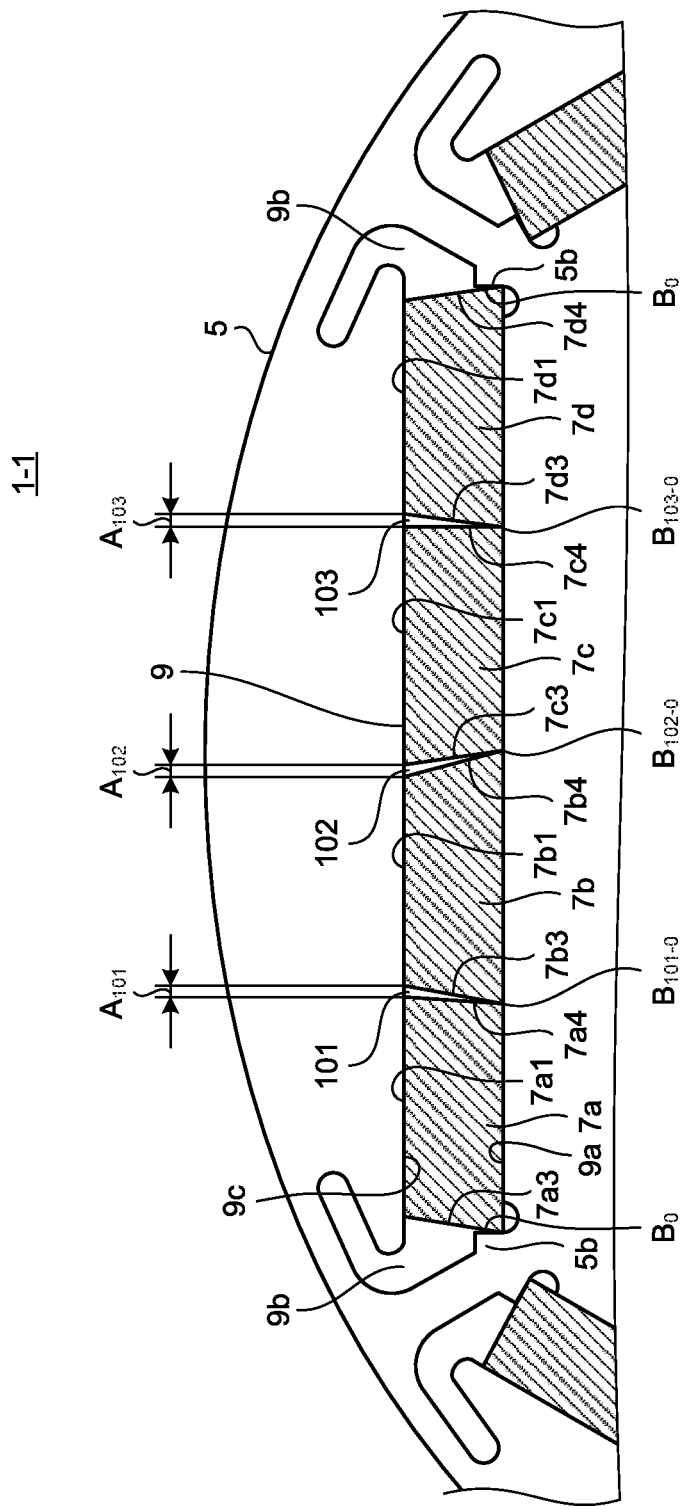
FIG. 6 is a diagram illustrating a first modification of the rotor according to the embodiment of the present invention.

FIG. 6 is a diagram illustrating a first modification of the rotor according to the embodiment of the present invention. In a rotor 1-1 of the example illustrated, a minute gap $B_0$ is formed between the rotating-direction side surface 7a3 of the permanent magnet 7a and the protrusion 5b; a minute gap $B_{101-0}$ is formed on a radially inner side of the gap 101; a minute gap $B_{102-0}$ is formed on a radially inner side of the gap 102; a minute gap $B_{103-0}$ is formed on a radially inner side of the gap 103; and a minute gap $B_0$ is formed between the rotating-direction side surface 7d4 of a permanent magnet 7d and the protrusion 5b. In the rotor 1-1 of the example illustrated, the permanent magnet 7a and the protrusion 5b look as if they are in contact with each other and the permanent magnet 7d and the protrusion 5b look as if they are in contact with each other. Furthermore, permanent magnets adjacent to each other look as if they are in contact with each other. If the gap $B_1$, the gap $B_{101}$, the gap $B_{102}$, and the gap $B_{103}$ are eliminated, inserting the permanent magnets 7a, 7b, 7c, and 7d into the magnet insertion hole 9 becomes difficult. Therefore, the minute gap $B_0$, the minute gap $B_{101-0}$, the minute gap $B_{102-0}$, and the minute gap $B_{103-0}$ to allow the permanent magnets 7a, 7b, 7c, and 7d to be inserted into the magnet insertion hole 9 with a clearance fit are provided between rotating-direction side surfaces of the two permanent magnets adjacent to each other on the radially inner side.

This structure limits the movement of the permanent magnets 7a, 7b, 7c, and 7d in accordance with the gaps $B_{101}$, $B_{102}$, and $B_{103}$, thereby allowing for the mitigation of noise and vibration due to movement of the permanent magnets 7a, 7b, 7c, and 7d when the rotor 1-1 rotates and the mitigation of risks of breakage due to repeated contact and separation of the permanent magnets adjacent to each other.

Figure 7:
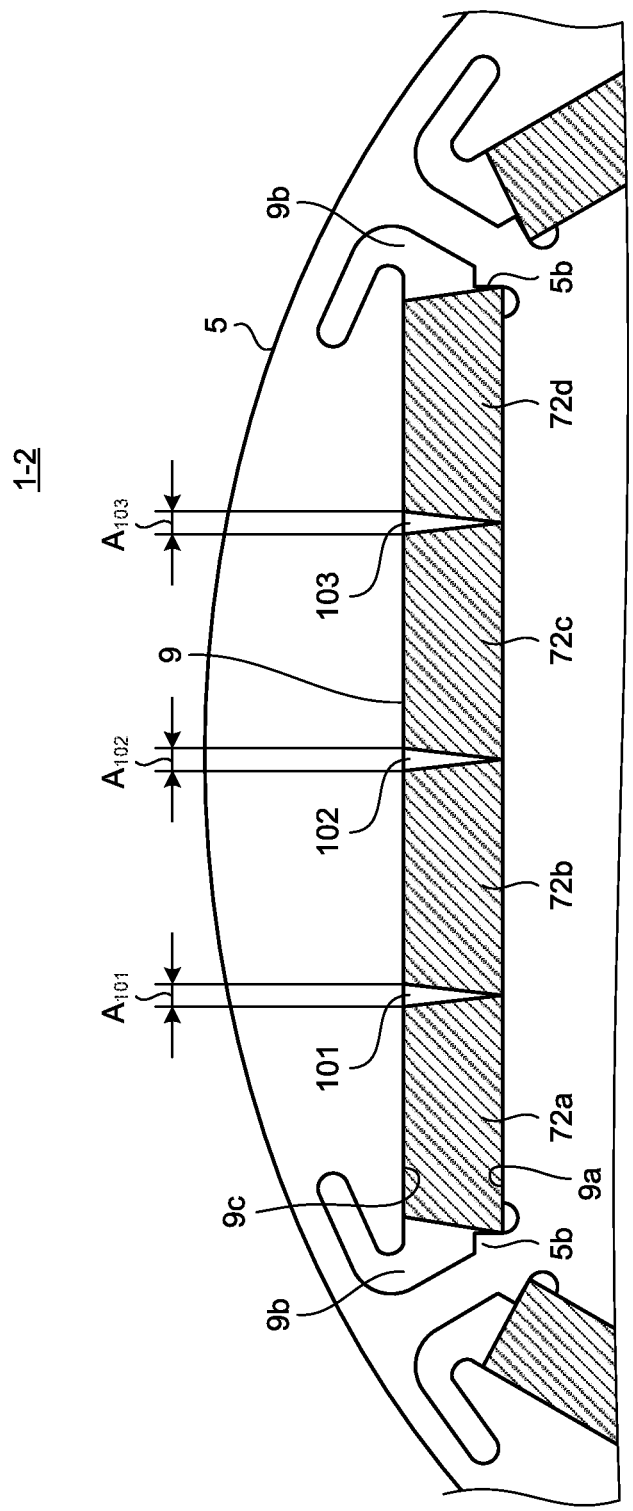
FIG. 7 is a diagram illustrating a second modification of the rotor according to the embodiment of the present invention.

FIG. 7 is a diagram illustrating a second modification of the rotor according to the embodiment of the present invention. In a rotor 1-2 in FIG. 7, permanent magnets 72a, 72b, 72c, and 72d having an isosceles trapezoid shape in cross section in a direction perpendicular to the axial direction of the rotor core 5 are used instead of the permanent magnets 7a, 7b, 7c, and 7d. The permanent magnets 72a, 72b, 72c, and 72d have the same shape and are inserted into the magnet insertion hole 9 such that a shorter base is located on the side of the radially outer side surface 9c of the magnet insertion hole 9 and the longer base is located on the side of the radially inner side surface 9a of the magnet insertion hole 9.

When a difference between the shorter base and the longer base of each of the permanent magnets 72a, 72b, 72c, and 72d is denoted as ΔW, the relation between the gaps $A_{101}$, $A_{102}$, and $A_{103}$ and the difference ΔW can be represented by formula (10).

[Formula 10]

$$A_{101}=A_{102}=A_{103}=\Delta W \quad (10)$$

Note that gaps are provided between the permanent magnets 72a, 72b, 72c, and 72d and the magnet insertion hole 9 in the rotating direction and the radial direction to allow the permanent magnets 72a, 72b, 72c, and 72d to be inserted into the magnet insertion hole 9 with a clearance fit. The size of ΔW can take any value within the range of the gap as long as the rotating-direction side surfaces of the permanent magnets adjacent to each other are not in contact with each other on the radially outer side even when the permanent magnet 72a, 72b, 72c, or 72d is inclined in the magnet insertion hole 9.

This structure allows the relation represented by formula (10) to be maintained even when the permanent magnets are inserted into the magnet insertion hole 9 in an order such as 72b, 72a, 72d, and 72c. This simplifies assembling of the rotor 1-2, thereby implementing improved productivity.

Note that when a rare earth magnet containing a rare earth element is used for the permanent magnets 7a, 7b, 7c, and 7d and the permanent magnets 72a, 72b, 72c, and 72d, the following effects can be obtained. A rare earth magnet has an advantage in that its magnetic force is high relative to its mass but it has a disadvantage in that coercivity drops in a high temperature environment and therefore irreversible demagnetization is likely to occur.

The structures of the rotors 1, 1-1, and 1-2 according to the present embodiments mitigate eddy currents and thus the temperature of the permanent magnets drops. Therefore, a rare earth magnet having the risk of irreversible demagnetization at a high temperature can be used, thereby allowing the motor efficiency to be improved due to a higher magnetic force as well as allowing the motor to be downsized and reduced in weight.

Figure 8:
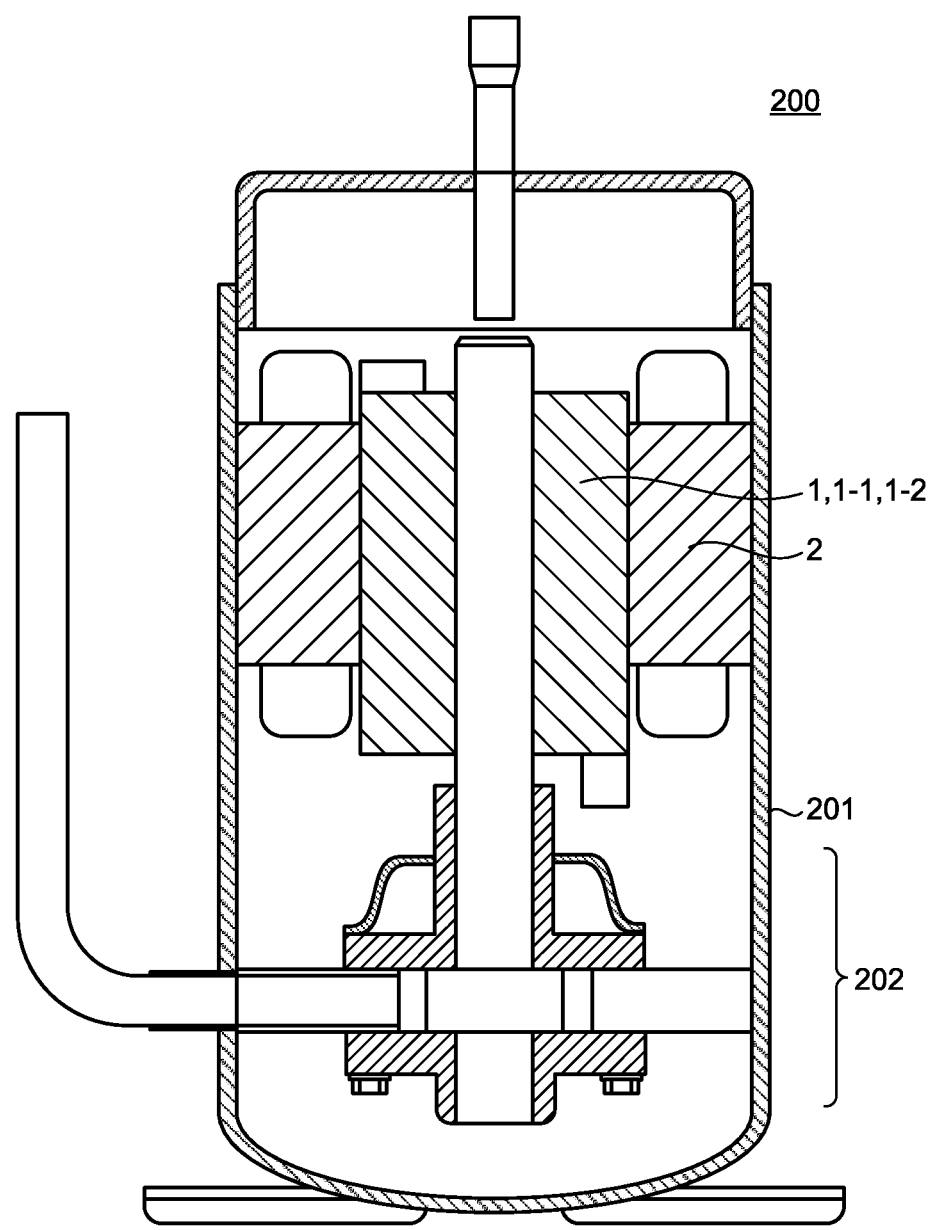
FIG. 8 is a cross-sectional view of a compressor equipped with the rotor and the stator core according to the embodiment of the present invention.

FIG. 8 is a cross-sectional view of a compressor equipped with the rotor and the stator core according to the embodiment of the present invention. A compressor 200 includes the stator 2; a frame 201 that encloses therein the stator 2;

a refrigerant compressor mechanism 202 installed inside the frame 201; and any one of the rotor 1, the rotor 1-1, and the rotor 1-2.

By equipping the compressor 200 exposed to a high temperature with any one of the rotor 1, the rotor 1-1, and the rotor 1-2, the efficiency of the compressor 200 can be improved and the compressor 200 can be downsized and reduced in weight.

Note that the rotors 1, 1-1, and 1-2 each having six magnetic poles have been described as an example in the present embodiment; however, the number of magnetic poles is not limited thereto. Moreover, the flux barrier 9b is formed between each of the permanent magnets 7 and each of inter-magnetic pole cores 5a in the rotors 1, 1-1, and 1-2 according to the present embodiment; however, it is possible for the flux barrier 9b not to be provided. Furthermore, the shape of the flux barrier 9b is not limited to the example illustrated.

The magnet insertion hole 9 of the present embodiment has a rectangular shape with the radially inner side surface 9a and the radially outer side surface 9c extending linearly in the rotating direction; however, the shape of the magnet insertion hole 9 is not limited thereto. That is, it is only required that respective gaps between rotating-direction side surfaces of permanent magnets adjacent to each other satisfy the relations represented by formulas (1) to (9). The magnet insertion hole 9 may have the radially inner side surface 9a and the radially outer side surface 9c each having a slightly curved shape. The magnet insertion hole 9 may have the same width in the rotating direction and in the radial direction.

As described above, the permanent-magnet-embedded electric motor according to the present embodiment includes a stator core; a rotor core disposed on the inner diameter side of the stator core and including a plurality of magnet insertion holes corresponding to the number of magnetic poles; and a plurality of permanent magnets arrayed in the rotating direction in the magnet insertion holes. The gap between two permanent magnets adjacent to each other among the permanent magnets disposed in the magnet insertion holes is formed such that the gap is larger on the radially outer side than on the radially inner side. This structure secures the gap between the rotating-direction side surfaces on the radially outer side even when the rotating-direction side surfaces of the permanent magnets adjacent to each other come into contact with each other due to the rotation of the rotor 1. This gap mitigates eddy currents that flow on the radially outer side of the permanent magnet, thereby allowing the suppression of the generation of heat in the permanent magnets. Therefore, it is possible to obtain the permanent-magnet-embedded electric motor that can reduce heat generation in the permanent magnets, is reduced in loss, and is resistant to demagnetization.

Note that the structures described in the above embodiments are merely exemplary structures of the present invention and it is obvious that the structures can be combined with other known techniques and can be partially omitted or modified within the scope of the present invention.

The invention claimed is:

1. A permanent-magnet-embedded electric motor, comprising:
a stator core;
a rotor core disposed on an inner diameter side of the stator core and including a plurality of magnet insertion holes corresponding to the number of magnetic poles; and
a plurality of permanent magnets arrayed in a rotating direction in the magnet insertion holes, wherein
a gap between two permanent magnets adjacent to each other among the permanent magnets disposed in the magnet insertion holes is larger on a radially outer side than on a radially inner side, and
the permanent magnets each have an isosceles trapezoid shape in cross section in a direction perpendicular to an axial direction of the rotor core with a shorter base located on a side of a radially outer side surface of the magnet insertion holes and a longer base located on a side of a radially inner side surface of the magnet insertion holes.

2. A permanent-magnet-embedded electric motor, comprising:
a stator core;
a rotor core disposed on an inner diameter side of the stator core and including a plurality of magnet insertion holes corresponding to the number of magnetic poles; and
a plurality of permanent magnets arrayed in a rotating direction in the magnet insertion holes, wherein
the permanent magnets each have an isosceles trapezoid shape in cross section in a direction perpendicular to an axial direction of the rotor core with a shorter base located on a side of a radially outer side surface of the magnet insertion holes and a longer base located on a side of a radially inner side surface of the magnet insertion holes.

3. A permanent-magnet-embedded electric motor, comprising:
a stator core;
a rotor core disposed on an inner diameter side of the stator core and including a plurality of magnet insertion holes corresponding to the number of magnetic poles, the magnet insertion holes each having a rectangular shape extending linearly in a rotating direction; and
a plurality of permanent magnets arrayed in a rotating direction in the magnet insertion holes, wherein
a gap between two permanent magnets adjacent to each other among the permanent magnets disposed in the magnet insertion holes is larger on a radially outer side than on a radially inner side.

4. The permanent-magnet-embedded electric motor according to claim 3, wherein the permanent magnets each have an isosceles trapezoid shape in cross section in a direction perpendicular to an axial direction of the rotor core with a shorter base located on a side of a radially outer side surface of the magnet insertion holes and a longer base located on a side of a radially inner side surface of the magnet insertion holes.

5. The permanent-magnet-embedded electric motor according to claim 1, wherein a minute gap that allows the permanent magnets to be inserted into the magnet insertion holes with a clearance fit is provided on the radially inner side and between rotating-direction side surfaces of the two permanent magnets adjacent to each other.

6. The permanent-magnet-embedded electric motor according to claim 2, wherein a minute gap that allows the permanent magnets to be inserted into the magnet insertion holes with a clearance fit is provided on the radially inner side and between rotating-direction side surfaces of the two permanent magnets adjacent to each other.

7. The permanent-magnet-embedded electric motor according to claim 3, wherein a minute gap that allows the permanent magnets to be inserted into the magnet insertion holes with a clearance fit is provided on the radially inner side and between rotating-direction side surfaces of the two permanent magnets adjacent to each other.

8. The permanent-magnet-embedded electric motor according to claim 1, wherein the permanent magnets are rare earth magnets.

9. The permanent-magnet-embedded electric motor according to claim 2, wherein the permanent magnets are rare earth magnets.

10. The permanent-magnet-embedded electric motor according to claim 3, wherein the permanent magnets are rare earth magnets.

11. A compressor equipped with the permanent-magnet-embedded electric motor according to claim 1.

12. A compressor equipped with the permanent-magnet-embedded electric motor according to claim 2.

13. A compressor equipped with the permanent-magnet-embedded electric motor according to claim 3.

* * * * *